US012461352B2

United States Patent
Malvache et al.

(10) Patent No.: US 12,461,352 B2
(45) Date of Patent: Nov. 4, 2025

(54) METHOD FOR ACQUIRING IMAGES OF AT LEAST ONE CELESTIAL BODY AND APPARATUS FOR IMPLEMENTING THE METHOD

(71) Applicant: UNISTELLAR, Marseilles (FR)

(72) Inventors: Arnaud Malvache, Fuveau (FR); Antonin Borot, Marseilles (FR)

(73) Assignee: UNISTELLAR, Marseilles (FR)

( * ) Notice: Subject to any disclaimer, the term of this patent is extended or adjusted under 35 U.S.C. 154(b) by 606 days.

(21) Appl. No.: 17/878,145

(22) Filed: Aug. 1, 2022

(65) Prior Publication Data

US 2023/0049756 A1    Feb. 16, 2023

(30) Foreign Application Priority Data

Aug. 2, 2021 (FR) ...................................... 2108394

(51) Int. Cl.
*G02B 17/06* (2006.01)
*G02B 17/08* (2006.01)

(52) U.S. Cl.
CPC ....... *G02B 17/0694* (2013.01); *G02B 17/061* (2013.01); *G02B 17/0896* (2013.01)

(58) Field of Classification Search
CPC .............. G02B 17/0694; G02B 17/061; G02B 17/0896; G02B 23/06; H04N 25/702; G03B 7/091; G03B 41/00; G06T 1/0007
See application file for complete search history.

(56) References Cited

U.S. PATENT DOCUMENTS

| | | | |
|---|---|---|---|
| 5,745,869 A | 4/1998 | Van Bezooijen | |
| 6,118,579 A * | 9/2000 | Endemann | G02B 23/06 359/857 |
| 10,955,936 B2 * | 3/2021 | Send | G01S 5/16 |
| 11,181,729 B2 * | 11/2021 | Malvache | G09B 27/04 |
| 11,828,928 B2 * | 11/2023 | Malvache | G01C 21/02 |
| 12,072,550 B2 * | 8/2024 | Malvache | G02B 23/06 |
| 2003/0218686 A1 | 11/2003 | Lundgren | |
| 2015/0028212 A1* | 1/2015 | Wright | G01J 5/08 250/340 |
| 2023/0049756 A1* | 2/2023 | Malvache | G03B 41/00 |
| 2023/0110398 A1* | 4/2023 | Malvache | H04N 23/45 348/218.1 |

FOREIGN PATENT DOCUMENTS

RU      2574522 C1      2/2016

OTHER PUBLICATIONS

French Preliminary Search Report issued Apr. 5, 2022, in corresponding to French Application No. 2108394; 7 pages.

* cited by examiner

*Primary Examiner* — Yaritza Guadalupe-McCall
(74) *Attorney, Agent, or Firm* — Maier & Maier, PLLC

(57) ABSTRACT

An image acquisition method includes defining a first optical sensor configuration of a matrix to acquire the image of a first celestial body of first nature, the first configuration having a plurality of unit pixels, defining at least one second optical sensor configuration of the matrix to acquire the image of the second celestial body of second nature, the second configuration having a plurality of macro-pixels formed by groupings of unit pixels, and selecting one of the optical sensor configurations, the selection being made according to the nature of the observed celestial body.

14 Claims, 12 Drawing Sheets

[Fig. 1]
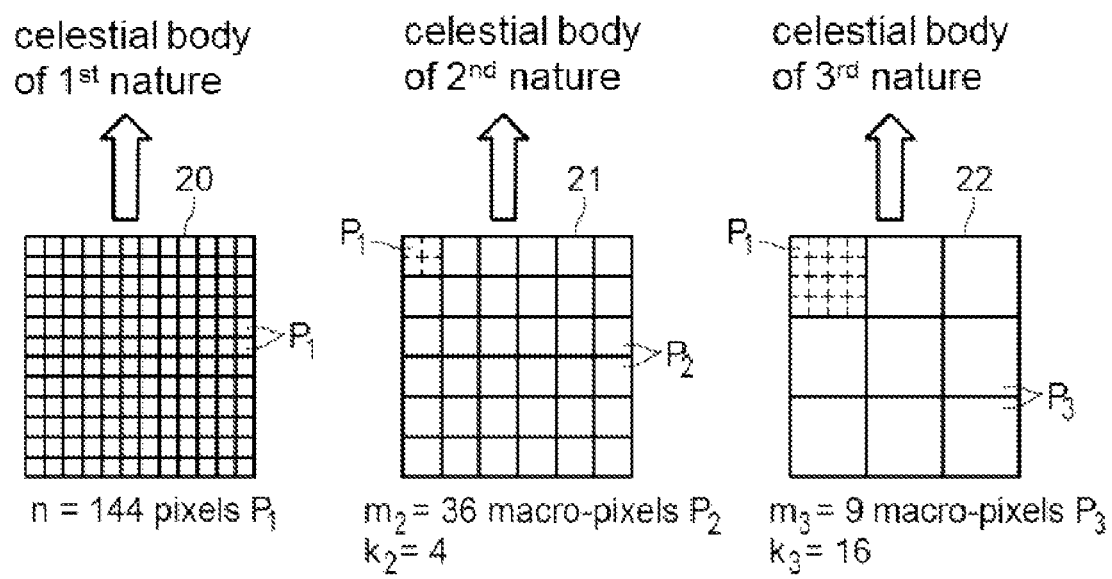
[Fig. 2]
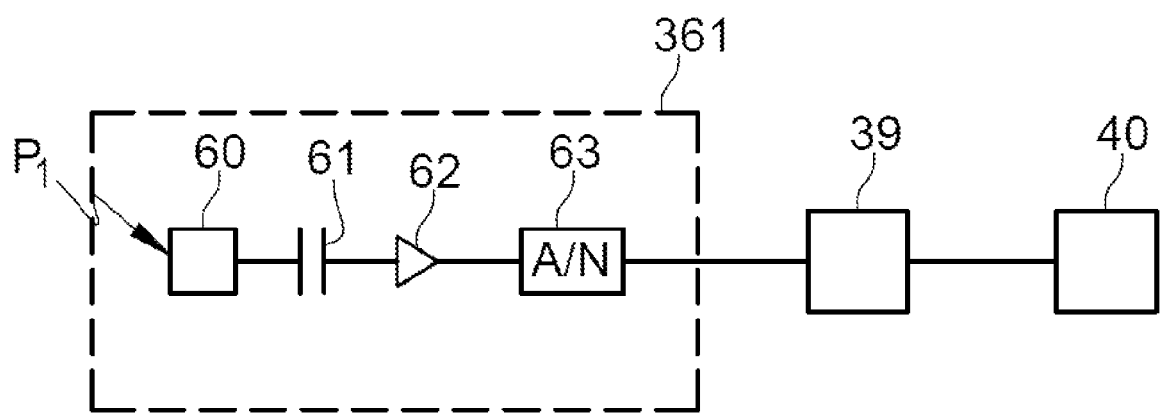

[Fig. 3]
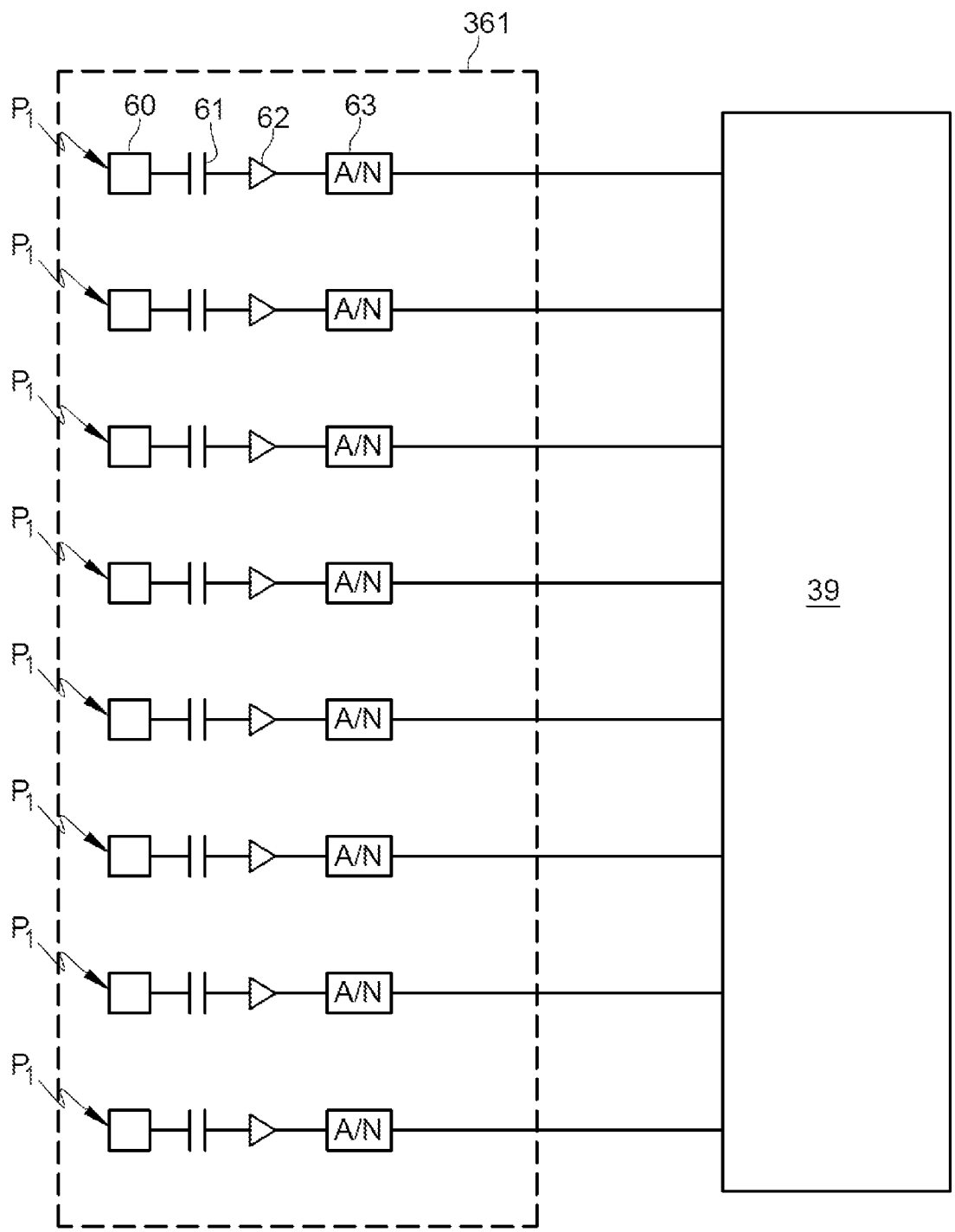

[Fig. 4a]
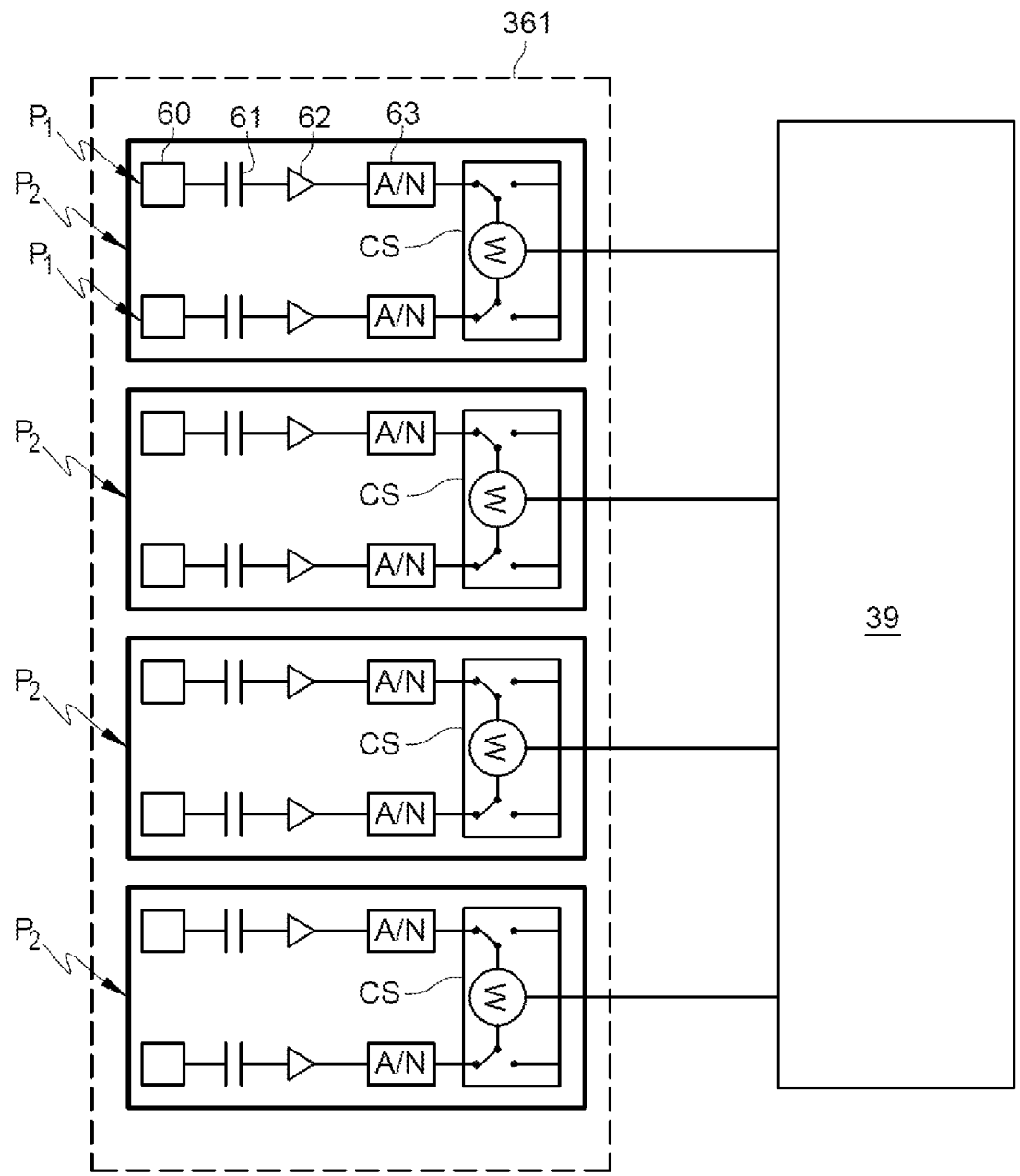

[Fig. 4b]
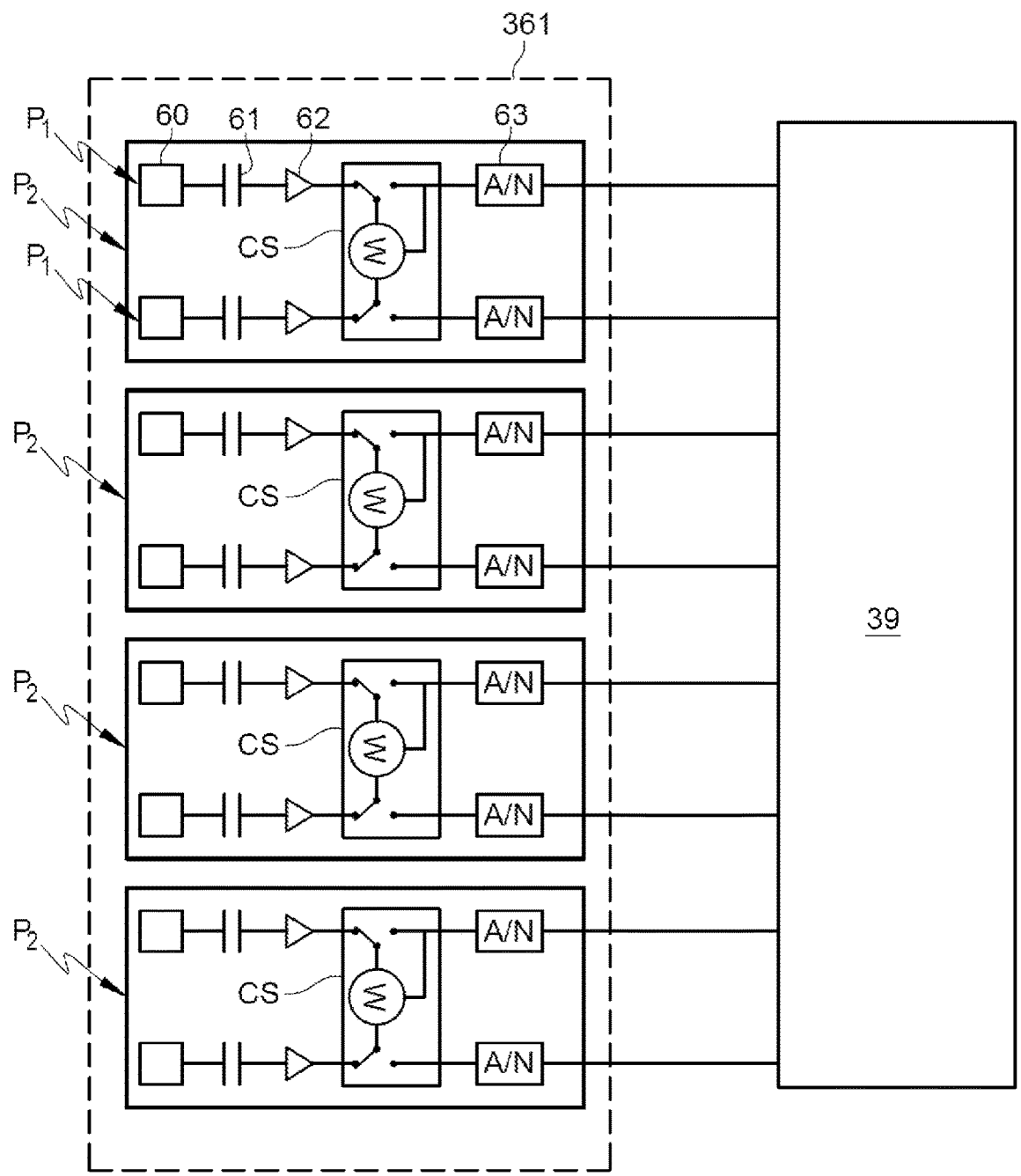

[Fig. 4c]
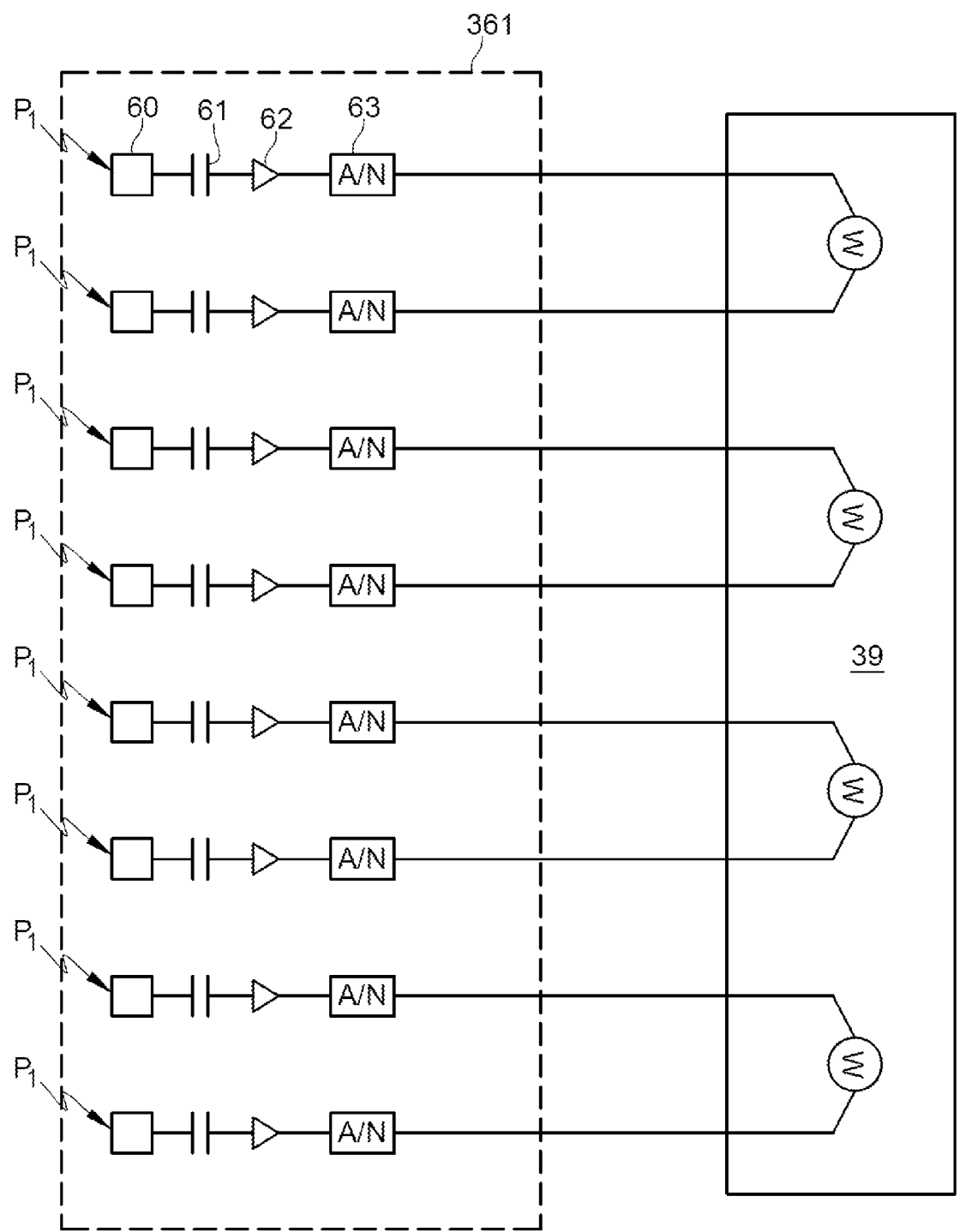

[Fig. 5]
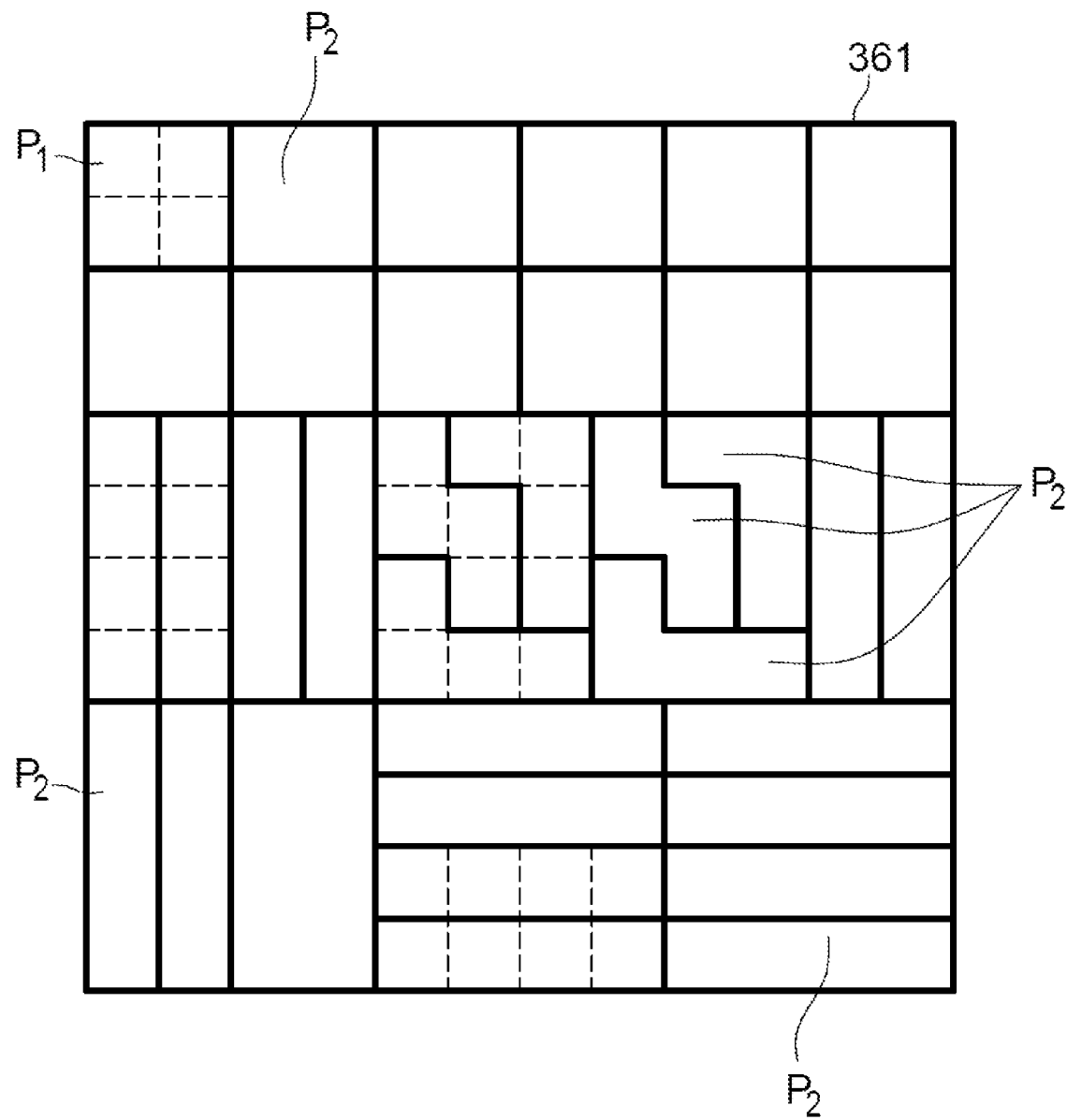

[Fig. 6a]
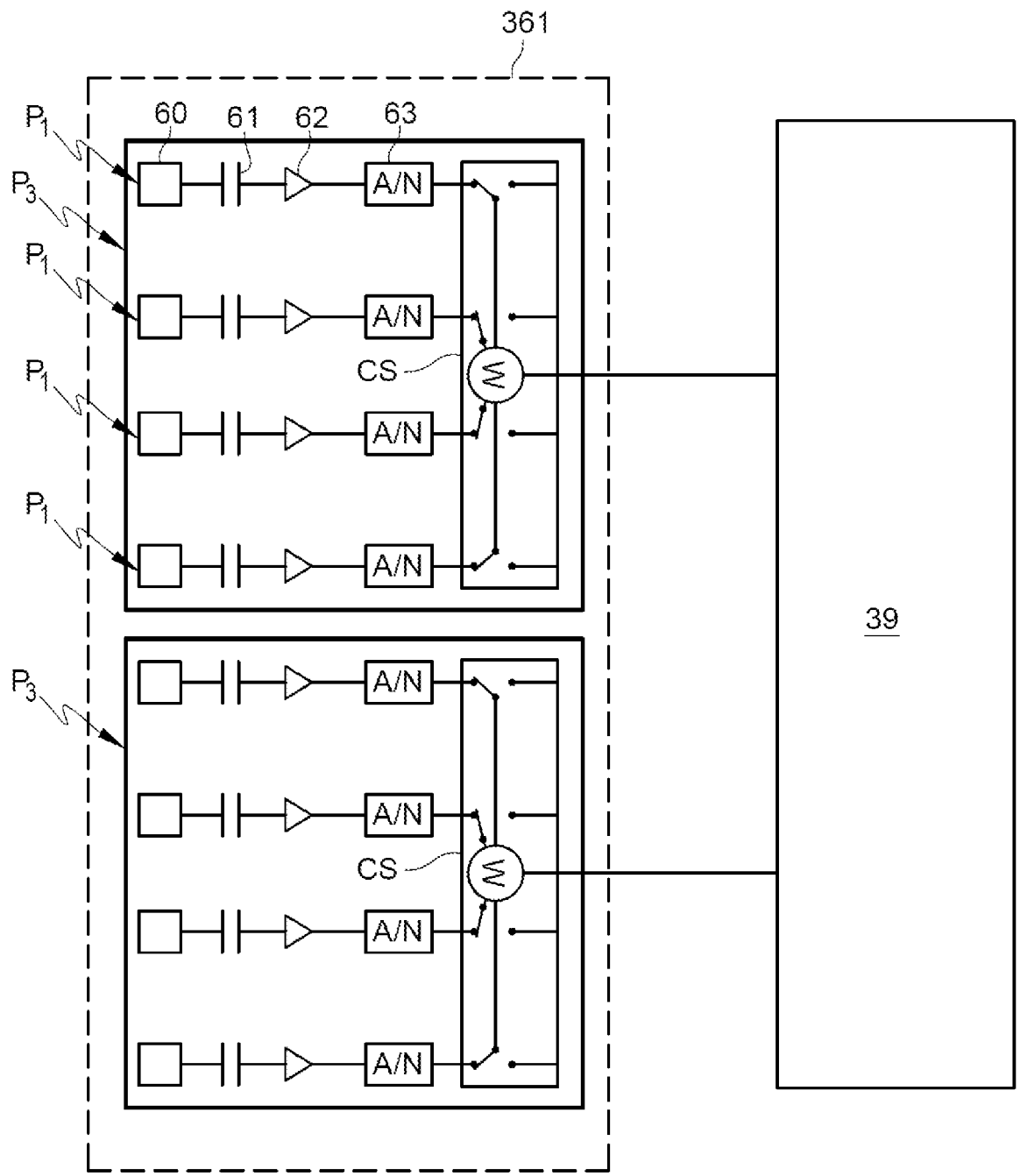

[Fig. 6b]
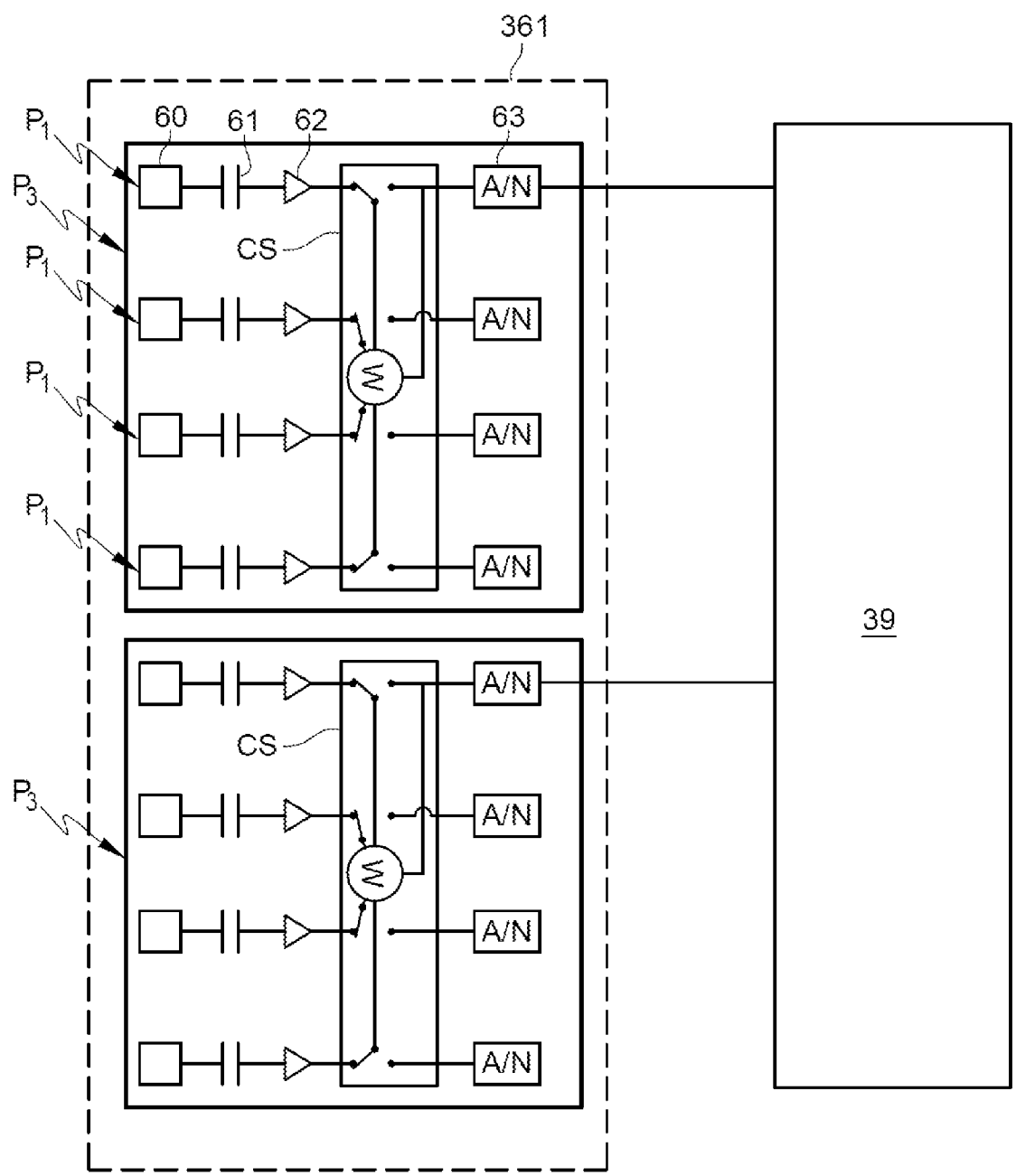

[Fig. 6c]
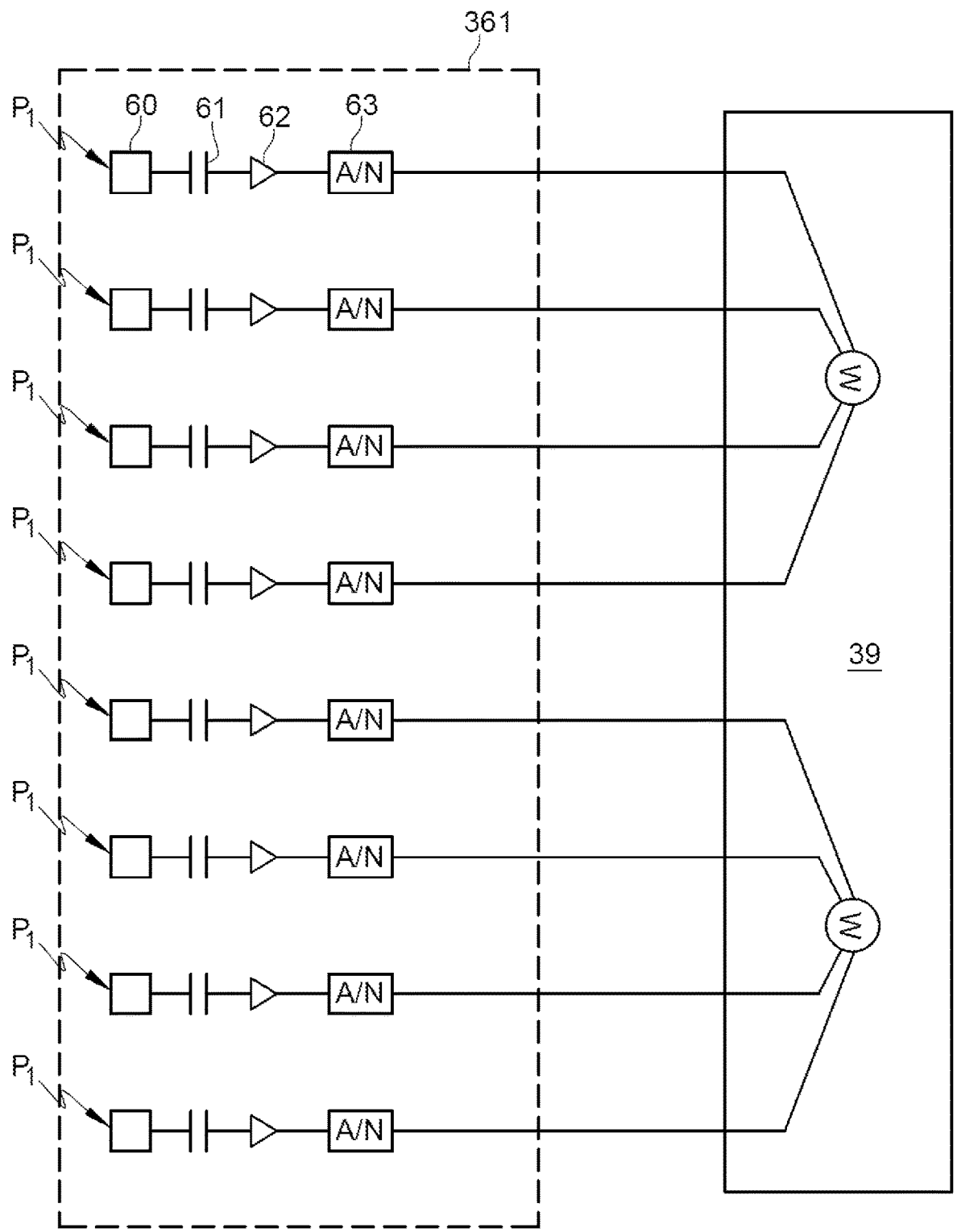

[Fig. 7]
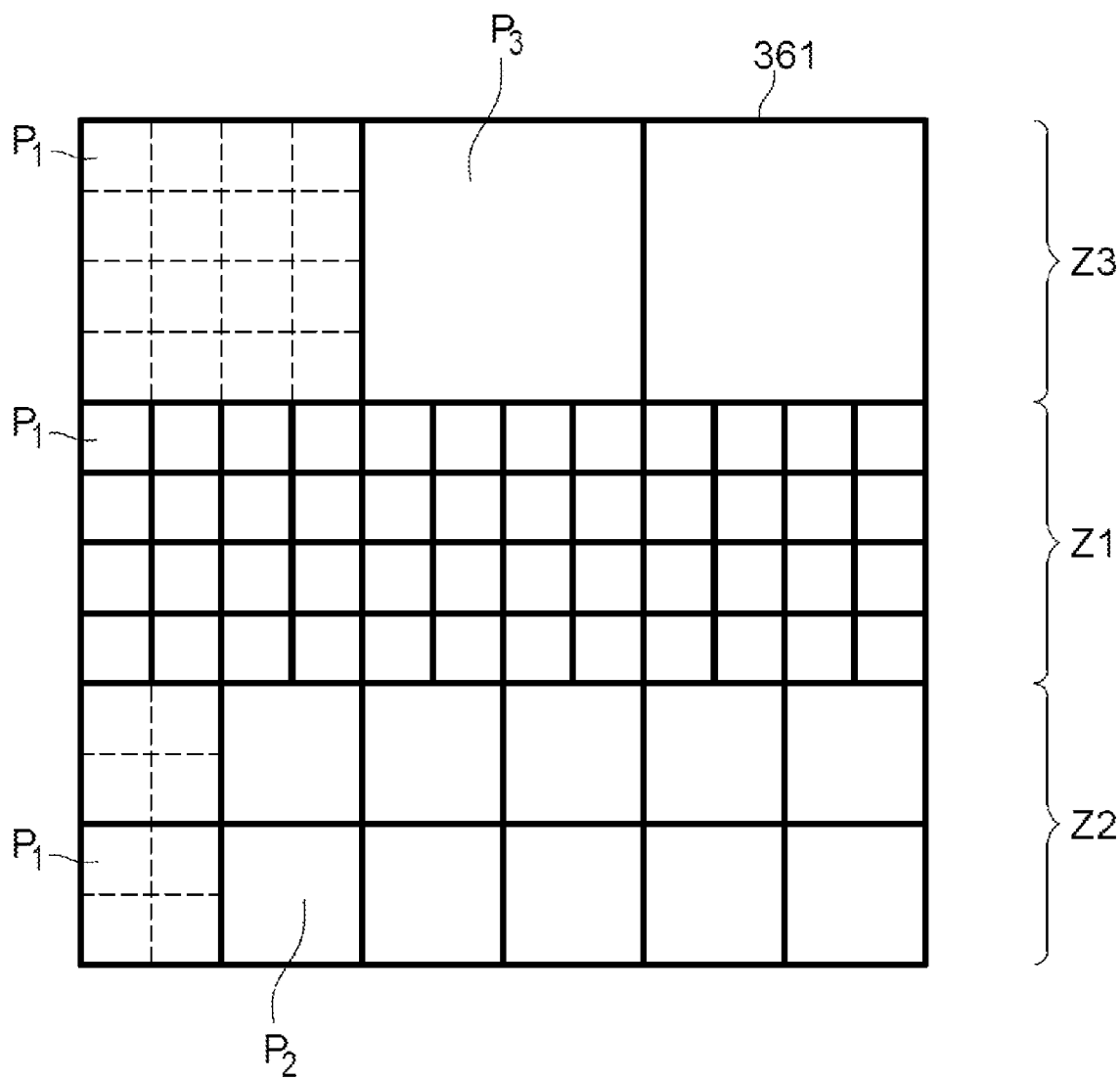

[Fig. 8]
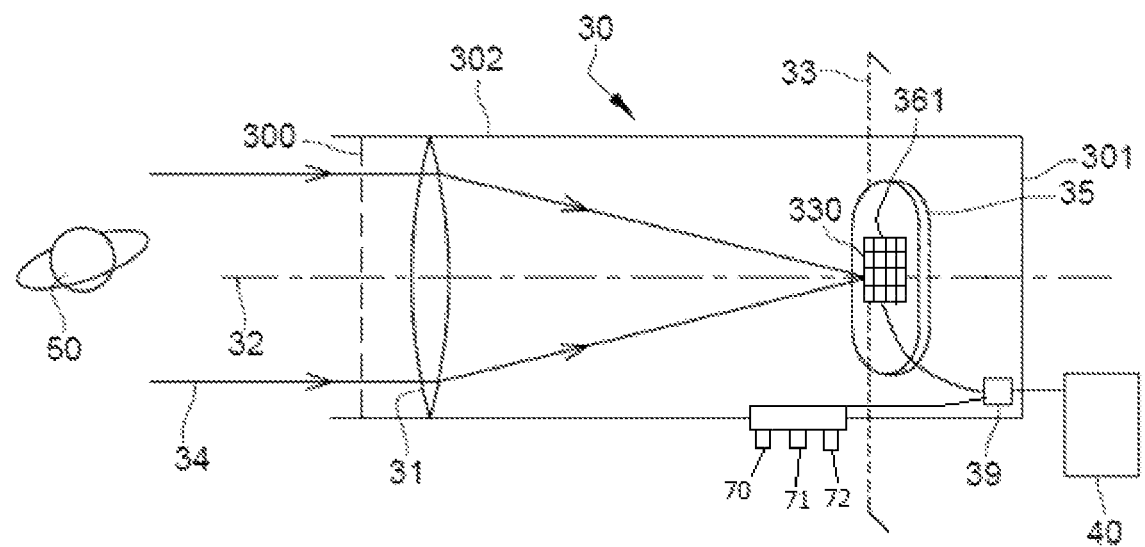
[Fig. 9]
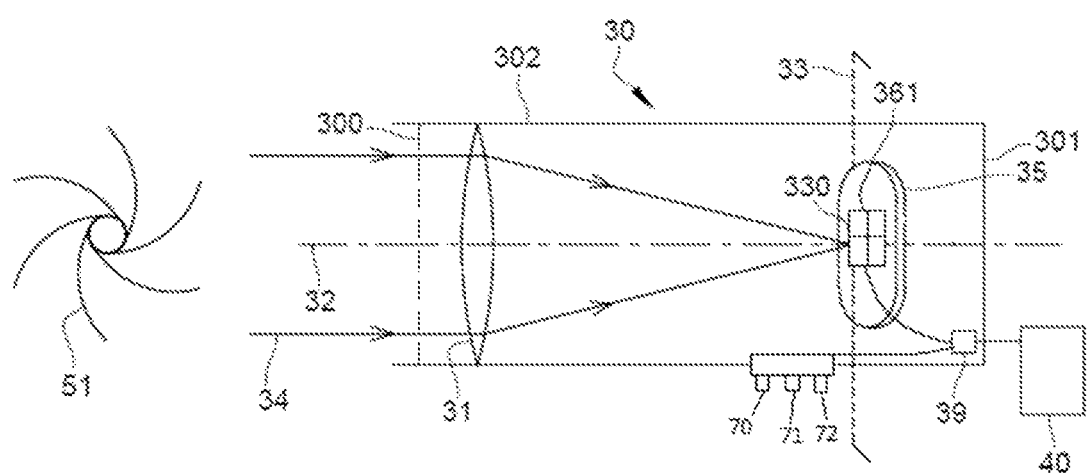

[Fig. 10]
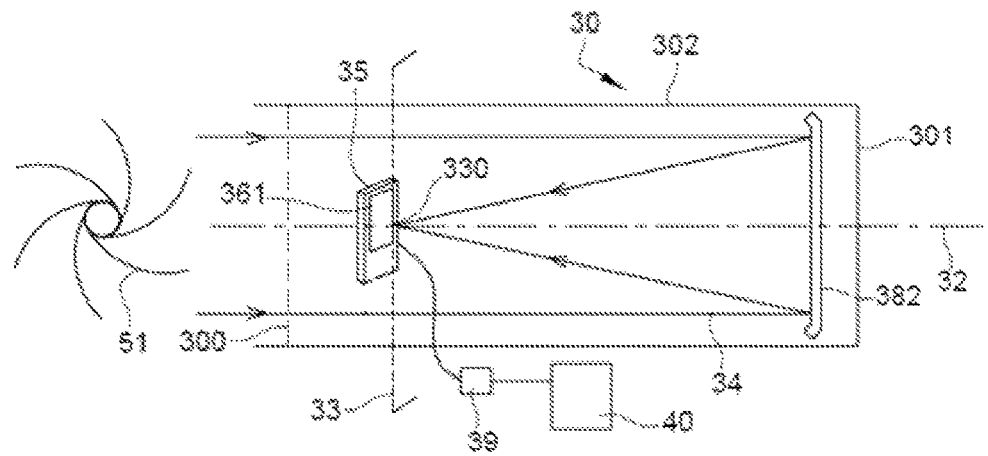
[Fig. 11]
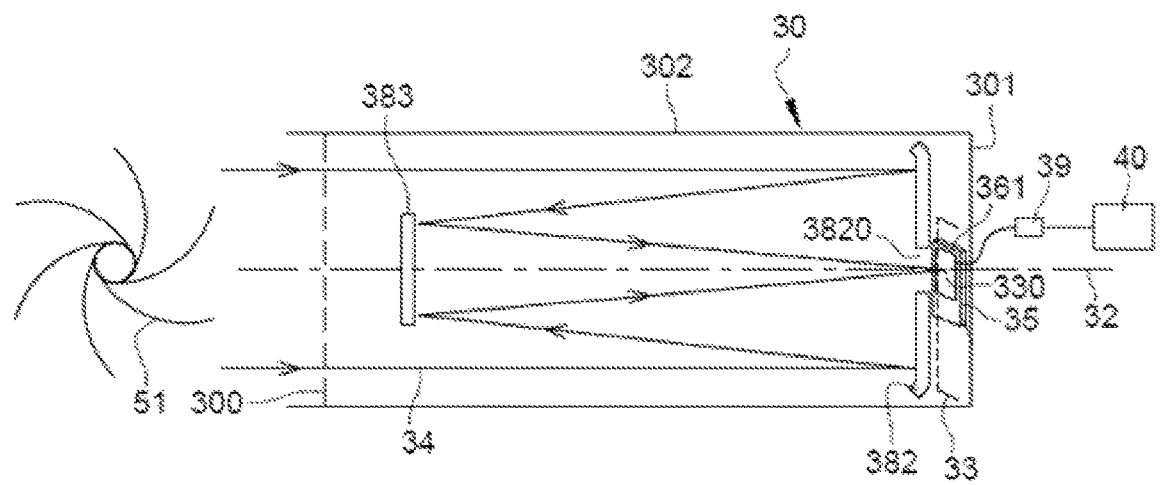

METHOD FOR ACQUIRING IMAGES OF AT LEAST ONE CELESTIAL BODY AND APPARATUS FOR IMPLEMENTING THE METHOD

TECHNICAL FIELD

The invention aims for a method for acquiring images of one or more celestial bodies. It also relates to an image capture apparatus comprising a plurality of interchangeable optical sensor configurations for the implementation of this process.

The invention relates to the technical field of shooting apparatuses and in particular that of telescopes (or astronomical scopes).

BACKGROUND

A telescope is intended to observe celestial bodies such as planets, comets, nebulae, galaxies, and generally, celestial objects, near or far. The telescope is used in particular by astronomers, although its use has been democratized in recent years and stargazing has become a passion for many people of different generations. In order to meet the demands of the growing number of consumers, manufacturers have had to diversify these instruments to meet the demands of a wider audience.

A user wishing to observe both large celestial bodies (e.g. nebulae, galaxies) and small celestial bodies (e.g. planets, moon) must have several eyepieces. It is by changing the eyepiece that the user can adapt the magnification according to the nature of the observed celestial body. Indeed, large celestial bodies are generally not very bright and their observation requires a low magnification. Conversely, smaller celestial bodies are generally brighter and their observation must be carried out with a stronger magnification. In practice, this change of eyepieces is particularly restrictive for the user.

An aim of the invention is to overcome the abovementioned disadvantages.

Another aim of the invention is to propose a technique making it possible to acquire, with one single apparatus, an image of a celestial body, with a good resolution, whether the celestial body is large and dark or small and bright.

Also, another aim of the invention is to propose an apparatus for the acquisition of images of a dark or bright celestial body, of which the design is simple, easy to use and inexpensive.

Document US 20150028212 is known in the state of the art which describes an apparatus seeking to follow the path of a missile by making, as needed, a wide plane and a narrow plane of it. Given its aim which aims for the acquisition of images of an object circulating in the Earth's atmosphere, such a technical document has nothing in common with the method and apparatus for acquiring images of a celestial body according to the present invention.

SUMMARY

The solution proposed by the invention is a method of acquiring an image of at least one celestial body, comprising the following steps:
using an apparatus comprising a hollow body inside which, in use, light rays coming from at least one observed celestial body penetrate, said observed celestial body being chosen from among at least one first celestial body of a first nature and one second celestial body of a second nature, the nature of the first celestial body being different from the nature of the second celestial body,
arranging, in the hollow body, an optical system having an optical axis, which optical system is configured such that the light rays form, in an image focus located in a focal plane, an image of the observed celestial body,
arranging in the image focus, a matrix of optical sensors to acquire the image of the observed celestial body, which matrix has a plurality n of unit pixels $P_1$,
defining a first optical sensor configuration of the matrix to acquire the image of the first celestial body of first nature, said first configuration having the plurality n of unit pixels $P_1$, n being a natural integer,
defining at least one second optical sensor configuration of the matrix to acquire the image of the second celestial body of second nature, said second configuration having a plurality $m_2$ of macro-pixels $P_2$ formed by groupings of unit pixels $P_1$, $m_2$ being a natural integer,
selecting one of the optical sensor configurations to acquire the image of the celestial body formed in the image focus, the selection of the optical sensor configuration being carried out according to the nature of the observed celestial body, either the abovementioned first celestial body of first nature or the abovementioned second celestial body of second nature.

In the scope of the present invention, the expression "celestial body of different nature" in connection with the first and second celestial bodies, means the fact that these two celestial bodies have a different size and/or brightness. Thus, such a different nature of these two celestial bodies means that each has its own nature, from the standpoint of its size and/or its brightness.

Thus, the nature of the celestial body does not refer here specifically to the fact that the celestial body likely to be observed by the first optical sensor configuration and the second optical sensor configuration is not identical in terms of celestial object. More specifically and as an example, two planets of substantially the same size that do not belong to the same solar system or galaxy are identical celestial objects. However, in the scope of the present invention, these two planets will not be considered as celestial bodies of the same nature, given the fact that their brightness, from the Earth, is not the same.

A macro-pixel is a group of several unit pixels. If this definition is applied to the example in FIG. 1, the first optical sensor configuration has (unit) pixels $P_1$ while the second and third optical sensor configurations have macro-pixels, respectively $P_2$ and $P_3$. The signals delivered by the unit pixels of a macro-pixel are considered as one single overall signal to be processed. This signal is representative of the radiation captured at the macro-pixel assembly.

Relating to the criterion of brightness, relative to the nature of the celestial body considered, this refers to the magnitude of this celestial body, observed from the surface of the Earth. It is known that the celestial bodies visible to the naked eye have an apparent magnitude of less than 6, with as examples, the star Vega having a magnitude equal to 0 and the sun of our solar system, a magnitude equal to −27, both being observed from the Earth's surface. In contrast, the least visible celestial bodies have an apparent magnitude of greater than 6.

The magnitude considered is advantageously an apparent magnitude or a surface brightness, well known to a person skilled in the art, the latter being more relevant for extended celestial objects such as galaxies or nebulae.

Thus, in the scope of the present invention, a plurality of optical sensor configurations can be provided, each intended to observe celestial bodies in a field of specific magnitudes. As an example, the image acquisition system according to the invention comprises a matrix comprising four configurations of separate optical sensors:

the first optical sensor configuration having unit pixels $P_1$ of a size suitable for the acquisition of images of celestial bodies of apparent magnitude of less than 0, the second optical sensor configuration having macro-pixels $P_2$ of a size suitable for the acquisition of images of celestial bodies of apparent magnitude of between 0 and 6 (including the upper limit), the third optical sensor configuration having macro-pixels $P_3$ of a size suitable for the acquisition of images of celestial bodies of apparent magnitude of between 6 and 14 (including the upper limit), and the fourth optical sensor configuration having macro-pixels $P_4$ of a size suitable for the acquisition of images of celestial bodies of apparent magnitude of greater than 14.

Below in the presentation of the invention, for simplification purposes, mainly two different natures of celestial bodies are considered, consisting on the one hand of a planet of our solar system considered as a small celestial body having a strong brightness (the apparent magnitude of which is, for example, less than 6) and on the other hand, a nebula, or cluster of galaxies, considered as a large celestial body having a low brightness (the apparent magnitude of which is, for example, greater than 6).

However, the present invention is not limited to defining two types of celestial bodies, for example by distinguishing between small, strongly bright celestial bodies, and large, quite dark celestial bodies. Thus, the invention can define more than two types of celestial bodies—corresponding to as many optical sensor configurations—to categorize the observed celestial bodies according to their size and/or their brightness.

Using several optical sensor configurations by grouping pixels together allows the user to view with the same apparatus, celestial bodies of a different nature. To acquire, with a good resolution, an image of a dark celestial body, a first configuration of sensors is selected. The other sensor configuration will be selected to acquire the image of a brighter celestial body. Thus, whether the celestial body is dark or bright, the costs of manufacturing, purchasing, maintaining and handling such an apparatus are greatly reduced.

The fact of using at least two optical sensor configurations—from unit pixels and groupings of said unit pixels—makes it possible to avoid the use of different optics, to observe bright or dark celestial bodies. Thus, the invention makes it possible to alternatively select one or the other of the sensor configurations, according to the nature of the celestial body that the user wishes to observe.

Other advantageous characteristics of the method which is the subject matter of the invention are listed below. Each of these characteristics may be considered alone or in combination with the outstanding characteristics defined above. Where applicable, each of these characteristics contributes to the resolution of specific technical problems defined further in the description, to which the outstanding characteristics defined above do not necessarily contribute. Where applicable, these may be the subject of one or more divisional patent applications:

According to one embodiment, the second optical sensor configuration is defined according to the formula $m_2=n/k_2$ with $k_2$ a natural integer greater than or equal to 2.

According to one embodiment, the second optical sensor configuration is defined according to the formula $m_2=n/k_2$ with $k_2$ a natural integer greater than or equal to 2.

According to one embodiment, the method comprises the steps consisting of:—acquiring an image of the observed celestial body by means of the matrix of optical sensors, and generating a digital representation of said image;—analyzing the numerical representation to calculate a brightness value of the observed celestial body;—and in which the selection of the optical sensor configuration is carried out automatically according to the result of a comparison of this calculated value with one or more pre-recorded threshold values or with one or more pre-recorded fields of threshold magnitudes.

According to one embodiment, the method comprises the steps consisting of:—acquiring an image of the observed celestial body by means of the matrix of optical sensors, and generating a digital representation of said image;—analyzing the numerical representation to calculate a brightness value of the observed celestial body;—and in which the selection of the optical sensor configuration is carried out automatically according to the value calculated from the brightness of the observed celestial body by comparing it with one or more of the pre-recorded threshold values or with one or more pre-recorded fields of threshold magnitudes.

According to one embodiment, the method comprises the steps consisting of:—acquiring an image of a first nature celestial body and a second nature celestial body by means of the matrix of optical sensors, the image of each celestial body being located in a separate zone of said matrix;—generating a digital representation of the acquired image;—analyzing the numerical representation to determine the first nature of the first celestial body and the second nature of the second celestial body;—automatically selecting the first optical sensor configuration in the zone of the matrix where the image of the first nature celestial body is located and the second optical sensor configuration in the zone of said matrix where the image of the second nature celestial body is located, said configurations being selected simultaneously.

According to one embodiment, the method comprises steps consisting of:—recording, in a database, records of celestial bodies, each record being associated with an optical sensor configuration, as well as real-time location data of the celestial body and/or at least one characteristic element of the celestial body;—selecting, in the database, a celestial body record;—selecting the optical sensor configuration associated with the selected celestial body record;—automatically orienting the apparatus to the location of the celestial body, according to the location data associated with the selected record.

According to one embodiment, the method comprises the steps consisting of:—acquiring an image of an observed celestial body in an observation scene corresponding to a portion of the celestial vault, which acquisition is carried out by means of one of the optical sensor configurations selected according to the nature of said celestial body;—executing a computer process configured to detect the movement of another celestial body in the observation scene;—selecting the other optical sensor configuration corresponding to said other celestial body.

According to one embodiment, the method comprises the steps consisting of:—recording, in a database, records of celestial bodies, each record being associated with one of the optical sensor configurations and at least one characteristic element of the celestial body;—acquiring an image of a celestial body, which acquisition is carried out by means of one of the optical sensor configurations;—executing a computer recognition process configured to detect, in the acquired image, at least one characteristic element of said celestial body;—identifying, in the database, a celestial body record associated with a characteristic element similar to that detected;—selecting the optical sensor configuration associated with the identified record;—if the optical sensor configuration that acquired the image does not match the selected optical sensor configuration, then selecting the latter sensor configuration.

Another aspect of the invention relates to an apparatus for the acquisition of images of a celestial body, comprising:

a hollow body inside which, in use, light rays coming from at least one observed celestial body penetrate, said observed celestial body being chosen from among at least one first celestial body of a first nature and one second celestial body of a second nature, the nature of the first celestial body being different from the nature of the second celestial body, an optical system arranged in a hollow body and having an optical axis, which optical system is configured such that the light rays form, in an image focus located in a focal plane, an image of the observed celestial body, a matrix of optical sensors, arranged in the image focus, consisting of a plurality n of unit pixels $P_1$, a first optical sensor configuration of the matrix to acquire the image of the first celestial body of first nature, said first configuration having the plurality n of unit pixels $P_1$, n being a natural integer, a second optical sensor configuration of the matrix to acquire the image of the second celestial body of second nature, said second configuration having a plurality $m_2$ of macro-pixels $P_2$ formed by groupings of unit pixels $P_1$, $m_2$ being a natural integer, a processing unit suitable for selecting one of the optical sensor configurations to acquire the image of the celestial body formed in the image focus, the selection of the optical sensor configuration being carried out according to the nature of the observed celestial body, either the abovementioned first celestial body of first nature or the abovementioned second celestial body of second nature.

Other advantageous characteristics of the apparatus which is the subject matter of the invention are listed below. Each of these characteristics may be considered alone or in combination with the outstanding characteristics defined above. Where applicable, each of these characteristics contributes to the resolution of specific technical problems defined further in the description, to which the outstanding characteristics defined above do not necessarily contribute. Where applicable, these may be the subject of one or more divisional patent applications:

According to one embodiment, the macro-pixels $P_2$ have the same shape within the second optical sensor configuration.

According to one embodiment, the macro-pixels $P_2$ have different shapes within the second optical sensor configuration.

According to one embodiment, the processing unit is suitable for simultaneously selecting the first optical sensor configuration in a zone of the matrix where the image of a first celestial body of first nature is located and the second optical sensor configuration in a zone of said matrix where the image of a second celestial body of second nature is located.

According to one embodiment, each unit pixel $P_1$ delivers a signal representative of a light intensity received, the matrix incorporates a summator circuit suitable for summing the signals generated by the unit pixels $P_1$ of a macro-pixel $P_2$ such that the signals delivered by said unit pixels of a macro-pixel $P_2$ are considered as one single overall signal to be processed by the processing unit.

According to one embodiment, the apparatus is in the form of a telescope (astronomic scope).

BRIEF DESCRIPTION OF THE FIGURES

Other advantages and characteristics of the invention will become clearer upon reading the description of the following preferred embodiment, by reference to the appended drawings, provided for guidance as non-limiting examples, wherein:

FIG. 1 is a diagram illustrating an example of three optical sensor configurations of a matrix, these three configurations being in accordance with the invention.

FIG. 2 schematically illustrates a component arrangement of a unit pixel.

FIG. 3 illustrates a way to process unit pixel signals when the matrix is in a first optical sensor configuration.

FIG. 4a illustrates a first way to process unit pixel signals forming macro-pixels when the matrix is in a second optical sensor configuration.

FIG. 4b illustrates a second way to process unit pixel signals forming macro-pixels when the matrix is in a second optical sensor configuration.

FIG. 4c illustrates a third way to process unit pixel signals forming macro-pixels when the matrix is in a second optical sensor configuration.

FIG. 5 schematizes an example of the arrangement of macro-pixels of different shapes.

FIG. 6a illustrates a first way to process unit pixel signals forming macro-pixels when the matrix is in a third optical sensor configuration.

FIG. 6b illustrates a second way to process unit pixel signals forming macro-pixels when the matrix is in a third optical sensor configuration.

FIG. 6c illustrates a third way to process unit pixel signals forming macro-pixels when the matrix is in a third optical sensor configuration.

FIG. 7 schematizes an example of the arrangement of unit pixels and macro-pixels of different sizes.

FIG. 8 is a cross-sectional view schematizing an image capture apparatus according to the invention, according to a first embodiment, the matrix being in a first optical sensor configuration.

FIG. 9 shows the apparatus of FIG. 8 with the matrix in a second optical sensor configuration.

FIG. 10 is a cross-sectional view schematizing an image capture apparatus according to the invention, according to a second embodiment.

FIG. 11 is a cross-sectional view schematizing an image capture apparatus according to the invention, according to a third embodiment.

DETAILED DESCRIPTION OF THE EMBODIMENTS

For clarity, the present invention makes reference to one or more "computer processes". The latter correspond to the actions or results obtained by the execution of instructions from different computer applications. Also, it must be understood in the sense of the invention that "a computer process is suitable for doing something" means "the instructions of a computer application executed by a processing unit do something".

Such as used here, unless otherwise specified, the use of ordinal adjectives "first", "second", etc., to describe an object simply indicates that different occurrences of similar objects are mentioned and does not imply that the objects thus described must be in any given sequence, whether in time, space, classification, or any other way.

The apparatus 30 which is the subject matter of the invention is used for the observation of both large and small celestial bodies. These celestial bodies or objects can be planets, stars, nebulae, galaxies, etc. It is preferably a telescope (or astronomic scope), but the apparatus can also be in the form of a camera or a video camera. For clarity, and as an illustrative example only, the rest of the description refers only to a telescope suitable for the observation of celestial bodies of a different nature, including relatively bright small celestial bodies 50 (e.g. planets, moon) and large darker celestial bodies 51 (e.g. nebulae, galaxies).

In the accompanying FIGS. 8 to 11, the telescope 30 comprises in particular, a hollow body 302 inside which penetrate, in use, light rays 34 coming from the observed celestial body 50, 51. The hollow body 302 has a first 300 end through which the light rays 34 penetrate and a second end 301 opposite to said first end.

The hollow body 302 preferably has the shape of a hollow tube with a circular cross-section, but could be a tube with an oval, square, octagonal or other cross-section. It is specified that the hollow body 302 is not necessarily tubular in shape, but can be conical, or formed of portions of tubes or of cones, for example. The hollow body 302 can be made of plastic, composite material, etc. As an example, its length is between 200 mm and 400 mm, its diameter is between 50 mm and 500 mm and its thickness is between 1 mm and 10 mm.

An optical system 31, 382, 383 is arranged in the hollow body 302 having an optical axis 32. The optical system is configured such that the light rays 34 form, in a focal plane 33, an image of the observed celestial body 50, 51.

The telescope has an optical axis 32. In the sense of the present invention, the optical axis means the line that passes through the center of each optical element of the optical system 31, 382, 383. The optical axis 32 is a rectilinear axis combined with the axis of symmetry of the telescope 30. Other configurations can be considered, however, in which the optical axis 32 is non-rectilinear and is broken down into a main optical axis (combined with the axis of symmetry) and a secondary optical axis.

The telescope has an image focus 330 at the intersection between the optical axis 32 and the light rays 34. The image focus 330 is in the focal plane 33.

A matrix of optical sensors 361 is arranged in the image focus 330 to acquire the image of the observed celestial body 50, 51, formed in said image focus 330.

In FIGS. 8 and 9, the matrix 361 is fixed on a support 35 installed in the hollow body 302, near the second end 301. The support 35 can optionally be movable. The support 35 is for example made of steel, carbon, or plastic material, such that its design is simple, inexpensive and durable over time. The support 35 is preferably circular in shape, but can also be square, octagonal, oval, etc. In general, the shape and dimensions of the support 35 are adapted to the dimensions of the matrix 361. For example, its surface area is between 2 $cm^2$ and 8 $cm^2$. These small dimensions make it possible to use a minimum of space in the apparatus 30.

In the embodiment of FIG. 10, the optical system comprises a primary mirror 382 arranged in the hollow body 302, on the side of the second end 301. This primary mirror 382 reflects and converges the light rays 34 to the support 35 placed in the image focus 330. The support 35 on which the matrix 361 is fixed, is preferably arranged in the first third of the hollow body 302, on the side of the first end 300 so as not to interfere with the tangent light rays reflected by the primary mirror 382.

In the embodiment of FIG. 11, the optical system comprises:
  a primary mirror 382 positioned in the hollow body 302, to reflect the light rays 34 penetrating into said body,
  a secondary mirror 383 positioned in the hollow body 302 to reflect the light rays reflected by the primary mirror 382.

Such an optical system makes it possible to reduce the length of the hollow body 302, while keeping the same focal length of a telescope with only a primary mirror 382 (such as illustrated in FIG. 10 for example).

The primary mirror 382 and the secondary mirror 383 are on the optical axis 32 which coincides with the axis of symmetry of said hollow body 302. These mirrors are pure reflection. The primary mirror 382 is preferably a concave parabolic mirror having a low focal ratio (preferably less than 5). This type of mirror makes it possible to avoid spherical aberrations. The diameter of the primary mirror 382 corresponds substantially to the internal diameter of the hollow body 302. This primary mirror 382 has in its center, an opening 3820 coaxial to the optical axis 32. The primary mirror 382 is arranged near the second end 301 of the hollow body 302. The secondary mirror 34 is positioned in the hollow body 302, at the first end 300. The installation of the secondary mirror 383 inside the hollow body 302 makes it possible to preserve its physical integrity during the handling and handling of the telescope 30.

The secondary mirror 383 is suitable for bringing the focal plane 33 behind the primary mirror 382, the reflected light rays passing through the opening 3820. This design makes it possible to decrease the focal length and length of the hollow body 302 and, in fact, to reduce the focal ratio while maintaining a primary mirror 382 having a relatively large diameter. The telescope 30 is therefore particularly light and compact. The secondary mirror 383 can be concave or convex. However, a flat mirror is preferably used. Using a flat mirror offers several advantages. It makes it possible to return by symmetry, the focal plane 33 behind the primary mirror 382 and, therefore, the focal length of the optical system. It is also a mirror of which the design is simple and inexpensive. The overall cost of the telescope 30 is therefore reduced. In addition, the alignment of a flat mirror 383 with the primary mirror 382 is simpler to achieve, which limits assembly time and labor costs. Using a flat mirror also makes it possible to use a secondary mirror of which the diameter is clearly smaller than that of the primary mirror

382, such that said primary mirror hardly obscures the light rays 34 penetrating into the hollow body 32.

To reduce the loss of brightness and improve resolution, a secondary flat mirror 383 of a smaller diameter is used. According to an advantageous embodiment, the secondary mirror 383 has a diameter equal to half the diameter of the primary mirror 382. Thus, only a small part of the surface of the primary mirror 382 and of the first end 300 are obstructed. A sufficient amount of light is thus likely to penetrate into the telescope 30 and be reflected by the primary mirror 382 such that a user can correctly observe the large, dark celestial bodies. As an example, the diameter of the secondary mirror 383 is between 25 mm and 250 mm for a primary mirror 382 having a diameter of between 50 mm and 500 mm.

The 361 matrix is arranged in the image focus 330, such that it does not interfere with the light rays 34 reflected by the primary mirror 382, nor with the light rays reflected by the secondary mirror 383. Thus, the light collected by the matrix 361 is optimized, and the loss of resolution due to the presence of the secondary mirror 383 is minimized. Furthermore, access to the matrix 361 is easier, such that its installation and/or its replacement is quicker and easier, without having to handle and/or disrupt the optical system 382, 383.

According to an embodiment variant, the matrix 361 is that of a user mobile terminal, preferably a smartphone or a tablet, fixed in a removable way on the hollow body 302, at the second end 301.

In the scope of the present invention, it is also possible to consider several matrices of optical sensors making it possible to obtain, in combination, with the fact for each matrix 361 to present a plurality of optical sensor configurations, a wider range of resolution such that not only the user can observe an even larger category of celestial bodies, but also to refine the resolution according to the nature of the observed celestial body. In the event where a plurality of matrices is used, this advantageously has different sizes. Indeed, the size of a matrix impacts on the field of view. Naturally, each of these matrices can be characterized by a matrix size, a pixel size, and a number of pixels which is specific to them.

However, below, one single matrix which has a plurality of optical sensor configurations 20, 21, 22 is advantageously considered, which makes it possible to observe as many categories of celestial bodies as there are optical sensor configurations, with one single matrix 361.

Thus, according to the present invention, the matrix 361 comprises optical sensor configurations 20, 21, 22 different so as to be suitable for the observation of celestial bodies 50, 51 of a different nature. As described below, these different optical sensor configurations 20, 21, 22 refer to a grouping of different pixels, conventionally from a size of unit pixels $P_1$ to a size of macro-pixels each formed by a grouping of a certain number of these unit pixels. Each configuration of pixels 20, 21, 22 is suitable for a type of celestial body to be observed. Indeed, the size of pixels and macro-pixels and their number impact on the resolution and sensitivity of the method and apparatus for acquiring images of a celestial body.

Generally, it is the size of the 361 matrix which determines the field of view. Indeed, the larger the matrix 361, the wider the portion of sky observed. It will therefore be possible to observe expanded celestial bodies, such as nebulae or celestial bodies of the deep sky. Conversely, with a smaller matrix 361, the observed portion of the sky will be further reduced. With the field of view being restricted, smaller celestial bodies such as planets can be observed.

Again, the aim of the present invention is to cover with one single matrix 361, all the possibilities for observing celestial bodies, from bright celestial bodies to dark celestial bodies. As outlined above, the principle of a plurality of optical sensor configurations 20, 21, 22 can be combined with the use of a plurality of matrices 361 provided that at least one matrix 361 has this plurality of optical sensor configurations 20, 21, 22. Thus, as an example, the size of the (single) matrix 361 is between 1 square millimeter ($mm^2$) and 1000 $mm^2$, preferably between 5 $mm^2$ and 50 $mm^2$.

The optical resolution of telescope 30 is generally defined by the dimension of the mirror or lens of the optical system 31. The pixel size of the sensor matrix 361 determines the digital resolution of the observed image and indirectly the option to zoom. Indeed, the more the size of the pixels decreases, the more the digital resolution increases. And by increasing the digital resolution, it is possible to achieve a good quality magnification of part of the observed image. Conversely, if the digital resolution is low, the magnification will be of a lower quality. The resolution of the digital telescope is determined by the least resolved element between the optic and the sensor matrix. It is therefore not interesting to use a pixel size smaller than the optical resolution of the telescope 30.

Pixel size also has an impact on light sensitivity. Small pixels are not very sensitive. Conversely, large pixels are more sensitive. If the user observes a small celestial body 50, like a planet for example, which is very bright, it is not necessary to have high sensitivity. The observation of small celestial bodies 50 can therefore be done with small pixels having a low sensitivity, such that the digital resolution is concentrated, which allows to observe details of the surface of the planet (e.g. storms, craters, etc.). Conversely, if the user observes a large celestial body 51, such as a nebula for example, which is dark, it is advantageous to have high sensitivity to light. These celestial bodies are large, it is not necessary to have a very high resolution to observe details there (gas clouds, galaxy arms).

The sensor 361 is preferably be CCD (Charged Coupled Device) or CMOS (Complementary Metal Oxide Semiconductor) sensor with a pixel arrangement (making it possible to generate images, preferably color images). This type of matrix has small dimensions, which makes it easy to install in a telescope or similar.

The matrix 361 has a plurality n of identical or similar pixels $P_1$, for example arranged in rows and columns, where n is a non-zero natural integer, the value of which depends on the size of said matrix. According to one embodiment, the number "n" is between $10^5$ (one hundred thousand pixels) and $10^9$ (one billion pixels), preferably between $10^6$ (one million) and $10^8$ (one hundred million). In the scope of the present invention, it is considered that the size of pixels $P_1$, or "unit" pixels, is between 0.1 µm and 20 µm, preferably between 0.5 µm and 10 µm. By the term "size", in connection with a pixel, this means that a side of a pixel—conventionally square or polygonal in shape—has the defined size.

Each unit pixel $P_1$ is a photosensitive component suitable for converting, by photoelectric effect, electromagnetic radiation into an electrical signal. FIG. 2 illustrates schematically, and by way of explanatory example only, an arrangement of components of a unit pixel $P_1$. This comprises a photoelectric conversion element 60, for example a photodiode, capable of generating a photocurrent representative of a received light intensity. It further comprises a capacitive storage element 61 integrating the photocurrent generated by the photoelectric conversion element 60. The measurement of the brightness level received by a pixel $P_1$ is carried out by measuring a voltage variation at the terminals of the capacitive element 61 between the start and the end of an integration period. The resulting signal then undergoes amplification (for example, by means of an operational amplifier 62) and digitization (for example, by means of an analog-to-digital converter 63) to be converted into a digital signal. These different digital signals are then transmitted to an electronic processing unit 39 suitable for generating a digital representation of the image of the celestial body 50, 51 formed in the image focus 330.

The connection between the matrix 361 and the unit 39 can be made wired or wirelessly, for example according to a proximity communication protocol, such as for non-limiting examples, the Bluetooth® protocol, Wi-Fi®, Zigbee®. The matrix 361 is connected to unit 39 and data coming from the matrix is observed on a screen 40.

According to one embodiment, the unit 39 comprises a computer in the form of a processor, microprocessor or CPU (for Central Processing Unit), a memory and generally, the computer resources to ensure the processing of the signals received from the matrix 361 for the formation of a digital representation of the image of the celestial body 50, 51 acquired by said matrix. These components are preferably mounted on an electronic board which makes it possible to group in one place, and on one single support, all the electronic components of the unit 39. This design makes it possible to minimize the number of electronic boards integrated into the telescope 30, and to reduce the amount of cabling. Furthermore, the manufacture of unit 39, its installation in the telescope 30 and, if necessary, its maintenance are greatly facilitated.

The digital representation generated by the unit 39 is displayed on a screen 40. The screen 40 can be fixed to the electronic board, such that the unit 39 and said screen form a one-piece assembly which can be easily handled. In this case, a flat screen is advantageously used, for example a polychrome LCD (Liquid Crystal Display) or OLED (Organic Light-Emitting Diode) screen.

According to another embodiment, the screen 40 is disconnected from the unit 39 and the electronic board. It is physically remote from the hollow body 302. In this embodiment, the screen 40 can be that of a user mobile terminal, for example the screen of a Smartphone or a touchscreen tablet. The connection between unit 39 and screen 40 can be made via a wired connection (for example, by means of a USB cable) or via a wireless connection, for example according to a proximity communication protocol, such as a non-limiting example, the Bluetooth protocol, Wi-Fi, ZigBee. This embodiment makes it possible to increase the compactness of the telescope 30, since the size of the screen 40 is not taken into account.

In FIG. 1, the matrix 361 has several optical sensor configurations, and as an example, three referenced configurations 20, 21 and 22. The first configuration 20 has the plurality n of unit pixels $P_1$. It is arbitrarily defined that the number n is equal to 144 pixels and that the size of each unit pixel $P_1$ is 10 μm. Naturally, this example comprises numerical values—size of each pixel and number of pixels—but these have no limiting character in the scope of the present invention.

In this first configuration 20, each unit pixel $P_1$ provides a digital signal, with processing unit 39 receiving and processing each of these signals. In other words, each unit pixel $P_1$ delivers a signal which is proportional to the number of incident photons on said unit pixel. Thus, the signals delivered by the unit pixels $P_1$ are considered as singular signals to be processed by the processing unit 39. FIG. 3 illustrates this case. Eight unit pixels $P_1$ are represented, each of these pixels transmitting a digital signal to the processing unit 39.

This first configuration 20 is intended for the observation of celestial bodies of a first nature. Considering that the size of the matrix 361 is unchanged, each configuration 20, 21 and 22 has the same overall size, identical to that of the matrix 361. Thus, compared to the other optical sensor configurations 21 and 22, the first optical sensor configuration 20 has a large number of n pixels $P_1$, each of a small size, in this case equal to the unit size of the pixels; the term "unit" being used here to name the smaller pixels in a 361 matrix. Thus, the first optical sensor configuration 20 is dedicated to bright celestial bodies, for example having an apparent magnitude of less than 0, such that with this first configuration 20, a good to very good resolution must be had, but that the brightness does not need to be increased significantly.

The second optical sensor configuration 21 has a plurality $m_2$ of macro-pixels $P_2$ formed by groupings of unit pixels $P_1$. According to one embodiment, the number $m_2$ is defined such that $m_2 = n/k_2$ with $k_2$ a natural integer of greater than or equal to 2. Advantageously, $k_2$ is less than or equal to n/16. In the example of FIG. 2, $k_2=4$ such that $m_2=36$ (144/4). Each macro-pixel $P_2$ is thus formed by a grouping of 4 unit pixels $P_1$. More generally, each macro-pixel $P_2$ is formed by a grouping of $k_2$ unit pixels $P_1$. The size of a macro-pixel $P_2$ is thus $k_2$ times the size of a unit pixel $P_1$.

In a macro-pixel $P_2$, the unit pixels $P_1$ can be grouped as rows and columns, which rows and columns may or may not have the same number of unit pixels $P_1$. A macro-pixel $P_2$ can thus have a square or rectangular shape. To best adapt to the shape and/or size of the celestial body and optimally acquire its image, a macro-pixel $P_2$ can however have another geometric shape and macro-pixels $P_2$ do not necessarily have the same shape within the second configuration 21 as illustrated in FIG. 5.

According to one embodiment, the macro-pixels $P_2$ are formed by groupings of unit pixels $P_1$ arranged in the form of rows and columns, which rows and columns have the same number of unit pixels. The plurality $m_2$ of macro-pixels $P_2$ is thus defined by $m_2 = n/p_2^2$ with $p_2$ a natural integer greater than or equal to 2. In other words, $k_2 = p_2^2$. Such a grouping of unit pixels makes it possible to have macro-pixels of square or substantially square shape, making it possible to generate a homogeneous digital representation of the captured image.

In the second configuration 21, the signals delivered by the unit pixels $P_1$ of a macro-pixel $P_2$ are considered as one single overall signal to be processed by the processing unit 39. This signal is proportional to the number of incident photons over the entire group of unit pixels $P_1$ forming the macro-pixel $P_2$. FIGS. 4a, 4b and 4c illustrate different ways of processing signals in the case of the second configuration 21. Four macro-pixels $P_2$ are represented, each of these macro-pixels being formed by a group of two unit pixels $P_1$.

In the embodiment of FIG. 4a, the signals of two unit pixels $P_1$ of a macro-pixel $P_2$ are summed after digitization. This can be done, for example, by means of a summator circuit CS integrated into the matrix 361 and activated by the processing unit 39 when the second configuration 21 is selected. The summator circuit CS receives, at the input, output signals from the analog-to-digital converters 63.

In the embodiment of FIG. 4b, the signals of the unit pixels $P_1$ of a macro-pixel $P_2$ are summed before digitization and after amplification (at the output of the analog-to-digital converter 63). The summator circuit CS receives, at the input, the output signals of the amplifiers 62. The output of the summator circuit CS is connected to one of the analog-to-digital converters 63 of the group of unit pixels $P_1$ of the macro-pixel $P_2$. Compared to FIG. 4a, the reading noise is decreased where the signal delivered by a macro-pixel $P_2$ only undergoes one single digitization before being transmitted to the processing unit 39.

Compared to the first configuration 20 illustrated in FIG. 3, the number of data transmitted to the processing unit 39 from matrix 391, is divided by a factor of 2 in FIGS. 4a and 4b and more generally by an abovementioned factor $k_2$. The refresh rate or frame rate of the matrix 361 can thus be multiplied by $k_2$.

In the embodiment of FIG. 4c, the processing unit 39 receives the signals emitted by all of the unit pixels $P_1$ of the matrix 361. The signals associated with the unit pixels $P_1$ constituting a macro-pixel $P_2$ are summed in the processing unit 39, for example by means of a software layer. This solution has the advantage of being able to use a matrix 361 less complex than those of FIGS. 4a and 4b (because it does not integrate the summator stage) and therefore, less expensive.

The second configuration 21 is defined to acquire the image of a second nature of a celestial body darker than a celestial body of first nature. As an example, it can be considered that these second-nature celestial bodies have an apparent magnitude of between 0 and 6. Indeed, as can be seen above, using macro-pixels $P_2$ of a larger size than the unit pixels $P_1$ makes it possible to capture greater radiation and therefore to benefit from greater brightness. In other words, the action of grouping $k_2$ pixels $P_1$ into one macro-pixel $P_2$ makes it possible to increase brightness. In return, resolution is lost.

The size of the celestial body can also be a criterion for selecting the second optical sensor configuration 21. As indicated above, the embodiments of FIGS. 4a and 4b make it possible to increase the refresh rate of the matrix 361. This can be particularly advantageous when the image of the observed celestial body is acquired in video mode and it is sought to improve the fluidity of the observed video. For a large bright celestial body such as the moon or the sun, a good resolution will be favored (first configuration 20) for an acquisition in the form of photographic shots, but a high refresh rate (second configuration 21) for viewing in video mode. Likewise, for a small, moving celestial body such as a comet, a high refresh rate can be favored (second configuration 21) for viewing in video mode.

The third optical sensor configuration 22 is similar to the second configuration 21 in that it has a plurality $m_3$ of macro-pixels $P_3$ formed by groupings of unit pixels $P_1$. Each macro-pixel $P_3$ is however formed by the grouping of a larger number of unit pixels $P_1$. According to one embodiment, the number $m_3$ is such that $m_3=n/k_3$ with $k_3$ a natural integer greater than $k_2$. In the example of FIG. 1, $k_3=16$ such that $m_3=9$ (144/16). Each macro-pixel $P_3$ is thus formed by a grouping of 16 unit pixels $P_1$. More generally, each macro-pixel $P_3$ is formed by a grouping of $k_3$ unit pixels $P_1$. The size of a macro-pixel $P_3$ is thus $k_3$ times the size of one unit pixel $P_1$.

In the second configuration 21, the signals delivered by the unit pixels $P_1$ of a macro-pixel $P_3$ of the third configuration 22 are considered as one single overall signal to be processed by the processing unit 39. This signal is proportional to the number of incident photons over the entire group of unit pixels $P_1$ forming the macro-pixel $P_3$.

FIGS. 6a, 6b and 6c illustrate different ways of processing signals in the case of the third configuration 22. Four macro-pixels $P_2$ are represented, each of these macro-pixels being formed by a group of four unit pixels $P_1$. The embodiments of FIGS. 6a, 6b and 6c are respectively similar to those of FIGS. 4a, 4b and 4c, except that it is now the signals of four unit pixels $P_1$ of a macro-pixel $P_3$ which are summed.

The third configuration 22 is defined to acquire the image of a third celestial body nature, in particular a celestial body darker than a celestial body of second nature. As an example, it can be considered that these second-nature celestial bodies have an apparent magnitude of greater than 6. The third optical sensor configuration 22 can also be selected in view of further increasing the refresh rate of the matrix 361 when viewing a celestial body in video mode.

It can thus be observed that for one single and same matrix 361, there are several optical sensor configurations 20, 21 and 22 which make it possible to optimally acquire images of celestial bodies of different natures, these natures being in accordance with the size and/or magnitude (brightness) of the observed celestial body.

Naturally, the invention is not limited to the use of three configurations 20, 21 and 22 and can provide a greater number of optical sensor configurations or, on the contrary, only two. In the latter case, the first configuration 20 can for example, be provided for celestial bodies of apparent magnitude of less than or equal to 6 and the second configuration for celestial bodies of apparent magnitude of greater than 6. In the same way, it can be considered to apply the invention by using several matrices 361, each of them 361 having a size, a number of pixels and a size of pixels different from each other to observe different natures of celestial bodies, provided that these different matrices, or at least one of them, have a plurality of optical sensor configurations to observe celestial bodies of different natures for each of these configurations.

According to one embodiment, once a configuration is selected according to the nature of the observed celestial body, the matrix 361 only has one single pixel size. Thus, the matrix 361 only has unit pixels $P_1$ when the first configuration 20 is selected, or only macro-pixels $P_2$ when the second configuration 21 is selected, or only macro-pixels $P_3$ when the third configuration 22 is selected.

According to an embodiment variant, the matrix 361 simultaneously has several configurations. This is particularly the case when the observed study scene comprises celestial bodies of several natures. The image formed in the image focus 330 can for example, comprise a celestial body of first nature (for example, the planet Mars of apparent magnitude −2.9), a celestial body of second nature (for example, the planet Uranus of apparent magnitude 5.3) and a celestial body of third nature (for example, a nebula of apparent magnitude 9). Thus, and as illustrated in FIG. 7, the matrix 361 can simultaneously have:

the first configuration 20 of unit pixels $P_1$ for a zone Z1 of the image in which a celestial body of first nature is located;

the second configuration 21 of macro-pixels $P_2$ for a zone Z2 of the image in which a celestial body of second nature is located; and the third configuration 22 of macro-pixels $P_3$ for a zone Z3 of the image in which a celestial body of third nature is located.

Below, different methods for selecting optical sensor configurations 20, 21, 22 are presented.

According to one embodiment, the selection is done manually by the user. In FIGS. 8 and 9, the telescope 30 has pushbuttons or similar 70, 71, 72 to modify the optical sensor configuration 20, 21, 22 and pass from one to the other successively or directly. For example, activating the first button 70, the second button 71, or the third button 72, causes the first configuration 20, the second configuration 21, or the third configuration 22 to be selected by the processing unit 39, respectively. To guide the user in the selection, these buttons 70, 71, 72 can be labeled with celestial body natures. For example, the first button 70 can be associated with the indications "bright planets/stars", the second button 71 with "celestial bodies of the deep sky" and the third button 72, with "galaxies/nebulae".

Controlling the optical sensor configuration 20, 21 or 22 can also be done by sending to the processing unit 39, control instructions emitted from a Smartphone of the user. These instructions are, for example, emitted following the activation of one or more dedicated keys displayed on a graphical interface of the Smartphone. These keys can be labeled in the same way as the buttons 70, 71, 72 described above. The Smartphone is suitable for communicating with the processing unit 39 and transmitting the control instructions, for example, via a Wi-Fi® or Bluetooth® connection. Upon receipt of these control instructions, the processing unit 39 controls the selection of the optical sensor configuration 20, 21, or 22.

Also, according to another embodiment, the selection of a configuration 20, 21 or 22 is done automatically. The selected configuration 20, 21 or 22 is thus activated without the user having to intervene. Different cases of automatic activation can be presented. The cases presented below are not limited to the invention, other uses could be considered.

In a first case, the user points their telescope 30 towards an observation scene corresponding to a portion of the celestial vault. The processing unit 39 is connected to a database in which are the main celestial bodies are recorded and known to a person skilled in the art. This database can be integrated into the telescope 30. In an embodiment variant, the database is remote from the telescope 30, for example hosted in a remote server to which the processing unit 39 is connected. The connection of the unit 39 to the database can, in this case, be done through a communication network, of the internal, 3G, 4G, 5G, etc. type.

Each celestial body record is associated, in the database, with an optical sensor configuration 20, 21 or 22 best suited to the observation of said celestial body, for example according to its size and/or brightness and/or an optimal digital resolution. Each registration is further preferably associated:

with one or more characteristic elements of the corresponding celestial body, for example its size, its pattern, its brightness, etc.; and/or with location data (or celestial coordinates) of said celestial body, in real time.

The user selects a celestial body record in the database and telescope 30 will itself point to said celestial body. The processing unit 39 records a piece of time data t corresponding to the acquisition period, i.e. the moment when the user selects the record in the database. The processing unit 39 then searches the database for the celestial coordinates of the celestial body at the time t. Using a correlation of the terrestrial location data of the telescope 30, for example by means of a GPS ("Global Positioning System") and the orientation data of said telescope, for example by means of an accelerometer, the processing unit 39 activates an embedded motorized device making it possible to automatically orient said telescope towards the location of the selected celestial body 50, 51. The processing unit 39 then or in parallel controls the selection of the optical sensor configuration 20, 21 or 22 associated with the selected record and which is best suited to observe this celestial body. The image can thus be optimally acquired.

In a second case, the user observes a celestial body and acquires its image with an optimal optical sensor configuration 20, 21 or 22 to observe this celestial body. Another celestial body moves in the field of view (or observation scene). The user observes for example, a small celestial body 50 (a planet) with the first active configuration 20 and an asteroid passes into the field of view. The processing unit 39 executes a computer process configured to detect this passage of this other celestial body into the observation scene. This process is for example, based on motion detection. It can thus be advantageous to zoom out to widen the observation scene and observe the asteroid for longer in video mode with an optimal refresh rate of the matrix 361. The second configuration 21 (or the third configuration 22) is thus selected by the processing unit 39. This automatic configuration change can also be achieved when the user initially observes a large celestial body 51 (with the third active configuration 22) and when it is advantageous to zoom in to restrict the observation scene (activation of the first or second configuration 20, 21).

In a third case, when the user points their telescope 30 towards a particular celestial body 50, 51, one of the optical sensor configurations 20, 21, 22 acquires the image of said celestial body and generates a digital representation of said image. This digital representation is then analyzed by processing unit 39.

According to one embodiment, this analysis is performed by executing a computer recognition process configured to detect at least one characteristic element, for example by implementing a threshold analysis. If needed, a person skilled in the art can in particular refer to patent documents FR3054897 and/or US2019196173 for more details on such a computer recognition process. Once the particular characteristic element has been detected, the processing unit 39 identifies, in the database, a celestial body record associated with a characteristic element similar to that detected. As soon as a similar characteristic element is detected, the record of the corresponding celestial body is identified as well as the optical sensor configuration 20, 21 or 22 associated with this record. The processing unit 39 thus selects the configuration 20, 21, or 22 associated with the record and sends a command or selection instruction to activate the corresponding configuration 20, 21, or 22. If the configuration 20, 21 or 22 having acquired the image is the correct one, it remains active. Conversely, if the configuration 20, 21 or 22 having acquired the image is not the correct one, then the processing unit 39 selects the correct optical sensor configuration 20, 21 or 22. The image can thus be optimally acquired.

According to another embodiment, the analysis of the digital representation is carried out by executing a computer process to calculate a value of the brightness (or apparent magnitude) of the observed celestial body. The selection of the optical sensor configuration 20, 21 or 22 is then carried out according to the result of a comparison of this calculated value with one or more threshold values pre-recorded in the database or with one or more threshold magnitude domains pre-recorded in said database. For example:

if the calculated value corresponds to an apparent magnitude of less than 0, the first configuration 20 is selected, if the calculated value corresponds to an apparent magnitude of between 0 and 6, the second configuration 21 is selected, if the calculated value corresponds to an apparent magnitude of less than 6, the third configuration 22 is selected.

If the acquired image comprises several celestial bodies with different brightnesses, several configurations can be selected simultaneously, each of these configurations being activated in a separate zone of the matrix 361 where the image of the corresponding celestial body is located.

According to another embodiment, the analysis of the digital representation is carried out by executing a computer process making it possible to calculate a size value of the observed celestial body. This size value is for example, determined by counting the number of unit pixels $P_1$ covered by the image of the celestial body on the matrix 361. The selection of the optical sensor configuration 20, 21 or 22 is thus carried out according to the result of a comparison of this calculated value with one or more threshold values pre-recorded in the database or with one or more pre-recorded threshold magnitude ranges. For example:

if the image of the celestial body covers less than 1,000 unit pixels $P_1$, the first configuration 20 is selected, if the image of the celestial body covers between 1,000 and $10^5$ unit pixels $P_1$, the second configuration 21 is selected, if the image of the celestial body covers more than $10^5$ unit pixels $P_1$, the third configuration 22 is selected.

If the acquired image comprises several celestial bodies with different brightnesses, several configurations can be selected simultaneously, each of these configurations being activated in a separate zone of the matrix 361 where the image of the corresponding celestial body is located.

According to another embodiment, the analysis of the digital representation is carried out by executing a computer process making it possible to detect a movement of the observed celestial body. If this celestial body is bright, the first configuration 20 could be selected by default. But if this celestial body is moving (for example, a comet), then the second configuration 21 or the third configuration 22 can be automatically selected so as to increase the refresh rate of the matrix 361 and to acquire images of the celestial body in video mode, as explained above.

If the acquired image comprises still celestial bodies and moving celestial bodies, several configurations can be selected simultaneously, each of these configurations being activated in a separate zone of the matrix 361 where the image of the corresponding celestial body is located.

Although the invention has been described in connection with several particular embodiments, it is clear that it is in no way limited to them and that it comprises all the technical equivalents of the means described, as well as their combinations if these fall within the scope of the invention. Furthermore, one or more characteristics and/or steps outlined only in one embodiment can be generalized to the other embodiments. Furthermore, one or more characteristics and/or steps outlined only in one embodiment can be combined with one or more other characteristics and/or steps outlined only in another embodiment.

The use of the verb "have", "comprise" or "include" and its conjugated forms does not exclude the presence of elements or steps other than those stated in a claim.

In the claims, any reference sign in brackets could not be interpreted as a limitation of the claim.

The invention claimed is:

1. A method for acquiring an image of at least one celestial body, comprising:
    using an apparatus comprising a hollow body inside which, in use, light rays coming from at least one observed celestial body penetrate, said observed celestial body chosen from among at least one first celestial body of a first nature and one second celestial body of a second nature, the nature of the first celestial body being different from the nature of the second celestial body
    arranging, in the hollow body, an optical system having an optical axis, the optical system is configured such that the light rays form, in an image focus located in a focal plane, an image of the observed celestial body,
    arranging in the image focus, a matrix of optical sensors to acquire the image of the observed celestial body, wherein the matrix has a plurality n of unit pixels $P_1$,
    defining a first optical sensor configuration of the matrix to acquire the image of the first celestial body of first nature, said first configuration having the plurality n of unit pixels $P_1$, n being a natural integer,
    defining at least one second optical sensor configuration of the matrix to acquire the image of the second celestial body of second nature, said second configuration having a plurality $m_2$ of macro-pixels $P_2$ formed by groupings of unit pixels $P_1$, $m_2$ being a natural integer,
    selecting one of the optical sensor configurations to acquire the image of the celestial body formed in the image focus, the selection of the optical sensor configuration carried out according to the nature of the observed celestial body, either the first celestial body of first nature or the second celestial body of second nature, and
    defining the second optical sensor configuration according to the formula $m_2=n/k_2$ with $k_2$ a natural integer of greater than or equal to 2.

2. The method according to claim 1, further comprising defining the second optical sensor configuration according to the formula $m_2=n/p_2^2$ with $p_2$ a natural integer of greater than or equal to 2.

3. The method according to claim 1, further comprising:
    acquiring an image of the observed celestial body by the matrix of optical sensors, and generating a digital representation of said image,
    analyzing the digital representation to calculate a value of the brightness of the observed celestial body,
    wherein the selection of the optical sensor configuration is automatically carried out according to the result of a comparison of this calculated value with one or more pre-recorded threshold values or with one or more pre-recorded threshold magnitude ranges.

4. The method according to claim 1, further comprising:
    acquiring an image of the observed celestial body by the matrix of optical sensors, and generating a digital representation of said image,
    analyzing the digital representation to calculate a value of the brightness of the observed celestial body,
    wherein the selection of the optical sensor configuration is automatically carried out according to the calculated value of the brightness of the observed celestial body by comparing it with one or more pre-recorded threshold values or with one or more pre-recorded threshold magnitude ranges.

5. The method according to claim 1, further comprising:
acquiring an image of a first celestial body of first nature and of a second celestial body of second nature by the matrix of optical sensors, the image of each celestial body located in a separate zone of said matrix,
generating a digital representation of the acquired image,
analyzing the digital representation to determine the first nature of the first celestial body and the second nature of the second celestial body,
automatically selecting the first optical sensor configuration in the zone of the matrix where the image of the first nature celestial body is located and the second optical sensor configuration in the zone of said matrix where the image of the second second-nature celestial body is located, said configurations selected simultaneously.

6. The method according to claim 1, further comprising:
recording, in a database, records of celestial bodies, each record associated with an optical sensor configuration as well as real-time location data of the celestial body and/or at least one characteristic element of the celestial body,
selecting, in the database, a celestial body record,
selecting the optical sensor configuration associated with the selected celestial body record,
automatically orienting the apparatus to the location of the celestial body, based on the location data associated with the selected record.

7. The method according to claim 1, further comprising:
acquiring an image of an observed celestial body in an observation scene corresponding to a portion of the celestial vault, the acquisition is carried out by one of the optical sensor configurations selected according to the nature of said celestial body,
executing a computer process configured to detect the movement of another celestial body in the observation scene,
selecting the other optical sensor configuration corresponding to said other celestial body.

8. The method according to claim 1, comprising:
recording, in a database, records of celestial bodies, each record associated with one of the optical sensor configurations and at least one characteristic element of the celestial body,
acquiring an image of a celestial body, the acquisition is carried out by one of the optical sensor configurations,
executing a computer recognition process configured to detect, in the acquired image, at least one characteristic element of said celestial body,
identifying, in the database, a celestial body record associated with a characteristic element similar to that detected,
selecting the optical sensor configuration associated with the identified record,
when the optical sensor configuration having acquired the image does not correspond to the selected optical sensor configuration, then selecting the latter sensor configuration.

9. An apparatus for acquiring images of a celestial bod, comprising:
a hollow body inside which, in use, light rays coming from at least one observed celestial body, said observed celestial body chosen from among at least one first celestial body of a first nature and one second celestial body of a second nature, the nature of the first celestial body being different from the nature of the second celestial body,
an optical system arranged in the hollow body and having an optical axis, the system is configured such that the light rays form, in an image focus located in a focal plane, an image of the observed celestial body,
a matrix of optical sensors, arranged in the image focus, consisting of a plurality n of unit pixels $P_1$,
wherein the apparatus comprises:
a first optical sensor configuration of the matrix to acquire the image of the first celestial body of first nature, said first configuration having the plurality n of unit pixels $P_1$, n being a natural integer,
defining at least one second optical sensor configuration of the matrix to acquire the image of the second celestial body of second nature, said second configuration having a plurality $m_2$ of macro-pixels $P_2$ formed by groupings of unit pixels $P_1$, $m_2$ being a natural integer,
a processing unit suitable for selecting one of the optical sensor configurations to acquire the image of the celestial body formed in the image focus, the selection of the optical sensor configuration carried out according to the nature of the observed celestial body, either the abovementioned first celestial body of first nature or the abovementioned second celestial body of second nature,
wherein the macro-pixels $P_2$ have the same shape within the second optical sensor configuration, and
wherein the processing unit is configured for simultaneously selecting the first optical sensor configuration in a zone of the matrix where the image of a first celestial body of first nature is located and the second optical sensor configuration in a zone of said matrix where the image of a second celestial body of second nature is located.

10. The apparatus according to claim 9, wherein the macro-pixels $P_2$ have different shapes within the second optical sensor configuration.

11. The apparatus according to claim 10, wherein the processing unit is configured for simultaneously selecting the first optical sensor configuration in a zone of the matrix where the image of a first celestial body of first nature is located and the second optical sensor configuration in a zone of said matrix where the image of a second celestial body of second nature is located.

12. The apparatus according to claim 9, wherein the processing unit is configured for simultaneously selecting the first optical sensor configuration in a zone of the matrix where the image of a first celestial body of first nature is located and the second optical sensor configuration in a zone of said matrix where the image of a second celestial body of second nature is located.

13. The apparatus according to claim 9, wherein:
each unit pixel $P_1$ delivers a signal representative of a light intensity received, and the matrix integrates a summator circuit suitable for summing the signals generated by the unit pixels $P_1$ of a macro-pixel $P_2$ such that the signals delivered by said unit pixels of a macro-pixel $P_2$ are considered as one single overall signal to be processed by the processing unit.

14. The apparatus according to claim 9, presented in the form of a telescope.

* * * * *